(12) United States Patent
Hooberman

(10) Patent No.: US 9,528,638 B2
(45) Date of Patent: Dec. 27, 2016

(54) ELECTROMAGNETIC INDUCTION WELDING OF PLASTIC PIPE DISTRIBUTION SYSTEMS

(75) Inventor: Gideon Hooberman, Kiryat Tivon (IL)

(73) Assignee: Huliot A.C.S. Ltd., Upper Galilee (IL)

( * ) Notice: Subject to any disclaimer, the term of this patent is extended or adjusted under 35 U.S.C. 154(b) by 585 days.

(21) Appl. No.: 14/009,518

(22) PCT Filed: Apr. 5, 2012

(86) PCT No.: PCT/IL2012/000150
§ 371 (c)(1),
(2), (4) Date: Oct. 2, 2013

(87) PCT Pub. No.: WO2012/137197
PCT Pub. Date: Oct. 11, 2012

(65) Prior Publication Data
US 2014/0014651 A1    Jan. 16, 2014

(30) Foreign Application Priority Data

Apr. 7, 2011   (IL) .......................................... 212205

(51) Int. Cl.
*F16L 13/02*    (2006.01)
*B29C 65/00*    (2006.01)
(Continued)

(52) U.S. Cl.
CPC .......... *F16L 13/0209* (2013.01); *B29C 65/368* (2013.01); *B29C 65/3656* (2013.01);
(Continued)

(58) Field of Classification Search
CPC ............. B29C 65/3656; B29C 65/3668; B29C 65/368; B29C 66/1222; B29C 66/1224; B29C 66/5221; B29C 66/52292; B29C 66/52295; B29C 66/52298; B29C 66/5344; B29C 66/72321; B29C 66/735; B29C 66/81423; B29C 66/83241; B29C 45/1459; B29C 65/364; B29C 65/3644; B29C 65/3648; B29C 65/56; B29C 66/52992; B29C 66/861; B29C 66/91951; B29C 66/96; B29C 66/9672; B29C 45/2616; F16L 47/03
(Continued)

(56) References Cited

U.S. PATENT DOCUMENTS 4,634,844 A    1/1987 Lodder et al.
4,695,335 A *  9/1987 Lyall ..................... B29C 65/342
                                                    138/155
(Continued)

FOREIGN PATENT DOCUMENTS

DE    29706501 U1    10/1997
EP    0294008 A2    12/1988
(Continued)

OTHER PUBLICATIONS

International Search Report dated Nov. 27, 2012, for International Application No. PCT/IL2012/000150.
(Continued)

*Primary Examiner* — Quang Van
(74) *Attorney, Agent, or Firm* — Novick, Kim & Lee, PLLC; Harold L. Novick

(57) ABSTRACT

Electromagnetic induction welding of plastic pipe distribution systems including inter alia induction weldable pipe connectors each having at least one induction weldable pipe socket. The induction weldable pipe sockets include a solid metal susceptor sleeve enveloping a plastic solder lining. Electromagnetic induction coil assemblies for clamping on induction weldable pipe sockets.

13 Claims, 11 Drawing Sheets

(51) Int. Cl.
  *B29C 65/36*    (2006.01)
  *F16L 47/02*    (2006.01)
(52) U.S. Cl.
  CPC ...... *B29C 65/3668* (2013.01); *B29C 66/1222* (2013.01); *B29C 66/1224* (2013.01); *B29C 66/5221* (2013.01); *B29C 66/52292* (2013.01); *B29C 66/52295* (2013.01); *B29C 66/52298* (2013.01); *B29C 66/5344* (2013.01); *B29C 66/72321* (2013.01); *B29C 66/735* (2013.01); *B29C 66/81423* (2013.01); *B29C 66/83241* (2013.01); *B29C 66/972* (2013.01); *F16L 47/02* (2013.01); *B29K 2995/0008* (2013.01)
(58) Field of Classification Search
  USPC ....... 219/644, 617, 634, 633, 635, 643, 603, 219/607, 616, 552, 553, 535, 544; 285/288.1, 21.2; 156/228, 244.22, 244.24, 156/267, 272.4, 285, 292, 379.7
  See application file for complete search history.

(56) References Cited

U.S. PATENT DOCUMENTS

| | | | |
|---|---|---|---|
| 5,125,690 A * | 6/1992 | Taylor | B29C 65/18 156/308.2 |
| 5,462,314 A | 10/1995 | Goto et al. | |
| 5,466,916 A | 11/1995 | Iguchi et al. | |
| 6,293,311 B1 | 9/2001 | Bushi et al. | |
| 6,509,555 B1 | 1/2003 | Riess et al. | |
| 6,639,197 B2 | 10/2003 | Riess et al. | |
| 6,639,198 B2 | 10/2003 | Riess et al. | |
| 6,710,314 B2 | 3/2004 | Reiss et al. | |
| 6,849,837 B2 | 2/2005 | Riess et al. | |
| 6,875,966 B1 | 4/2005 | Barber et al. | |
| 7,141,768 B2 | 11/2006 | Malofsky et al. | |
| 7,220,948 B2 | 5/2007 | Holzer et al. | |
| 7,344,161 B2 | 3/2008 | Howard et al. | |
| 7,399,949 B2 | 7/2008 | Barber et al. | |
| 7,491,916 B1 | 2/2009 | Barber et al. | |
| 8,424,924 B2 | 4/2013 | LaMarca et al. | |
| 2002/0011305 A1 | 1/2002 | Malofsky et al. | |
| 2003/0102671 A1 | 6/2003 | Fritze | |
| 2004/0091694 A1 | 5/2004 | Holzer et al. | |
| 2008/0029507 A1 | 2/2008 | Barber et al. | |
| 2010/0084097 A1 | 4/2010 | Stauffer et al. | |

FOREIGN PATENT DOCUMENTS

| | | |
|---|---|---|
| EP | 0333379 A2 | 9/1989 |
| EP | 0645234 A1 | 3/1995 |
| EP | 2172328 A1 | 4/2010 |
| GB | 2314597 A | 1/1998 |
| GB | 2384535 B | 6/2005 |
| JP | H05-118486 A | 5/1993 |
| JP | 6-278211 A | 10/1994 |
| JP | 6-278212 A | 10/1994 |
| JP | 6-281079 A | 10/1994 |
| JP | 7-269774 A | 10/1995 |
| JP | 9-170692 A | 6/1997 |
| JP | 2001-208274 A | 8/2001 |
| JP | 2008-111459 A | 5/2008 |
| WO | 91/09247 A1 | 6/1991 |
| WO | 2010/033163 A2 | 3/2010 |

OTHER PUBLICATIONS

SIPO Office Action dated Dec. 24, 2014, for counterpart Chinese Application No. 201280016984.1.

* cited by examiner

ELECTROMAGNETIC INDUCTION WELDING OF PLASTIC PIPE DISTRIBUTION SYSTEMS

FIELD OF THE INVENTION

The invention relates to induction weldable pipe connectors and electromagnetic induction coil assemblies for electromagnetic induction welding of plastic pipe distribution systems for the transport of fluids in residential, commercial and industrial plumbing systems.

BACKGROUND OF THE INVENTION

Induction welding employs electromagnetic induction to susceptors for melting plastic parts of plastic pipe distribution systems.

European Patent Publication No. 0 294 008 illustrates and describes an induction weldable socket and a process and apparatus for manufacturing such a socket and a process for connecting the socket to a penetrating pipe part. An induction weldable socket 2 includes an inductively heatable lining 3 near the inner wall of the socket. The socket 2 is manufactured by feeding an inductively heatable lining to a transverse extrusion head of an extruder 21 and cutting the extruded pipe with lining 3 from the extruder to a socket 2. The inductively heating lining 3 may be fed to the extrusion head 22 as a hose 37 assembled or woven from conducting wires or a tube 37 formed from a strip of gauze 34 or an assembly consisting of short-circuited 19a windings obtained by spirally winding a conducting wire.

European Patent Publication No. 0 294 008 FIG. 2 shows an electromagnetic induction coil assembly 10. The electromagnetic induction coil assembly 10 is convenient for placing on an induction weldable socket 2 from above. But the electromagnetic induction coil assembly 10 does not envelope the induction weldable socket 2 from the underside which can lead to weaker welding in comparison to the topside.

Japan Patent Application Publication No. JP 2008111459 illustrates and describes an electromagnetic wave generating apparatus 3 including an electromagnetic mechanism portion 31 for dismountable surrounding a pipe fitting 1 including a series of discrete spaced apart metal rings 11 having a high electric resistance.

PCT International Publication No. WO 2010/033163 illustrates and describes susceptor layers 108 for electromagnetic bond welding of thermoplastic pipe distributions systems and clamp-on electromagnetic coil assemblies for on-site plumbing installations. Susceptor layers 108 are formed from thermoplastic resin in which ferromagnetic particles are embedded.

WO 2010/033163 FIGS. 2A and 2B show an electromagnetic coil assembly including a clamp section 202A enclosing a coil section 206A, a clamp section 202B pivoted to the clamp section and enclosing a coil section 206B, and terminals 208A and 208B respectively connected to coil sections 206A and 206B. WO 2010/0033163 paragraph [0032] describes two fully detachable electromagnetic coil sections with suitable electrical connections for placing around a coupling and then being bolted or clamped together.

SUMMARY OF THE INVENTION

The present invention is directed toward induction weldable pipe connectors and electromagnetic induction coil assemblies for electromagnetic induction welding of plastic pipe distribution systems for transporting fluids in residential, commercial and industrial plumbing systems. Suitable plastic pipe distribution systems can be made from thermoplastics including inter alia PVC, PP, PP-R, HDPE and the like, and thermosetting plastics including inter alia PEX, and the like. Fluids include liquids such as water, oil, gasoline, alcohol, and the like, and gases such as steam, natural gas, propane, compressed gas, and the like. The induction weldable pipe connectors of the present invention can be implemented in a wide range of pipe fittings including inter alia couplers, elbow fittings, Tee fittings, Y fittings, X fittings, and the like.

The induction weldable pipe connectors of the present invention include at least one induction weldable pipe socket for electromagnetic induction welding to a plastic pipe end. The induction weldable pipe sockets each include a solid metal susceptor sleeve enveloping a plastic solder lining Metal susceptor sleeves can be formed from a wide range of electrical conductive metals and are preferably formed from ferromagnetic metals. Accordingly, the metal susceptor sleeves can be formed from aluminum, brass, steel, and the like. Induction weldable pipe sockets can be formed with solder linings of different plastics such that an induction weldable pipe socket can be selected such that its solder lining is of the same or highly similar plastic material as the plastic pipe it is intended to be used with for electromagnetic induction welding purposes.

The susceptor sleeve and the solder lining are in intimate complementary interlocking contact. Suitable interlocking contact surfaces include inter alia complementary ridged surfaces staggered along a pipe socket's longitudinal axis, complementary castellated patterns, and the like. Susceptor sleeves can have an exposed metal surface co-directional with a pipe socket's longitudinal axis. Alternatively, induction weldable pipe sockets can include a plastic covering enveloping its susceptor sleeve such that a susceptor sleeve is embedded between a plastic covering and a plastic solder lining The induction weldable pipe connectors of the present invention can be readily manufactured by conventional injection molding techniques.

A solid metal susceptor sleeve is intended to absorb electromagnetic energy by electromagnetic induction on operation of an electromagnetic induction coil assembly for generating an electromagnetic field acting on the susceptor sleeve. The susceptor sleeve becomes sufficiently heated to melt its plastic solder lining. The plastic solder lining in turn melts an outer surface of a plastic pipe end forcibly inserted into the pipe socket to pre-load same. The solder lining and the plastic pipe end weld together to form a single welded sealed joint comparable to alternative joint welding techniques. The solder linings typically exude beyond a susceptor sleeve end face during a welding process for providing a visual user indication regarding progress of the welding process. Solid metal susceptor sleeves afford a considerably more efficient conversion of electromagnetic energy to heat energy in comparison to hitherto described induction weldable pipe sockets. Such increased conversion efficiency affords the use of less electromagnetic energy which in turn means smaller and lighter electromagnetic energy generators.

Induction weldable pipe connectors can be designed to weld two or more plastic pipes of the same material or different material. Induction weldable pipe connectors can be designed to weld two or more plastic pipes of the same diameter or different diameters. Induction weldable pipe connectors can include a connector end formed with a screw thread for screw thread engagement with a flow component having a complementary screw thread fitting. The screw thread can be formed of metal or plastic and can be external or internal.

The induction weldable pipe connectors of the present invention can be employed with conventional electromagnetic induction coil assemblies including inter alia hitherto described EO 0 294 008 and WO 2010/033163 electromagnetic induction coil assemblies. The present invention is also directed towards electromagnetic induction coil assemblies designed to be readily placed on induction weldable pipe connectors for electromagnetic welding purposes and subsequently removed therefrom. The electromagnetic induction coil assemblies of the present invention include an induction coil designed to provide near uniform electromagnetic field intensity at a given radial distance around an induction weldable pipe socket in contradistinction to EP 0 294 008's electromagnetic induction coil assembly.

The electromagnetic induction coil assemblies of the present invention preferably include a tubular housing formed from a pair of semi-tubular shells can be either detachable from one another or pivotal about a pivot axis. The semi-tubular shells are each provided with a spiral coil component extending peripherally therearound and in serial electrical connection such that on being energized they generate two electromagnetic fields which combine together to provide near uniform electromagnetic field intensity at a given radial distance around an induction weldable pipe socket. Alternatively, the pivotal tubular housing can be provided with a single induction coil extending peripherally around both its semi-tubular shells such that it undergoes inflection about the pivot axis on opening and closing the tubular housing.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE INVENTION

Induction Weldable Pipe Connectors

Figure 1:
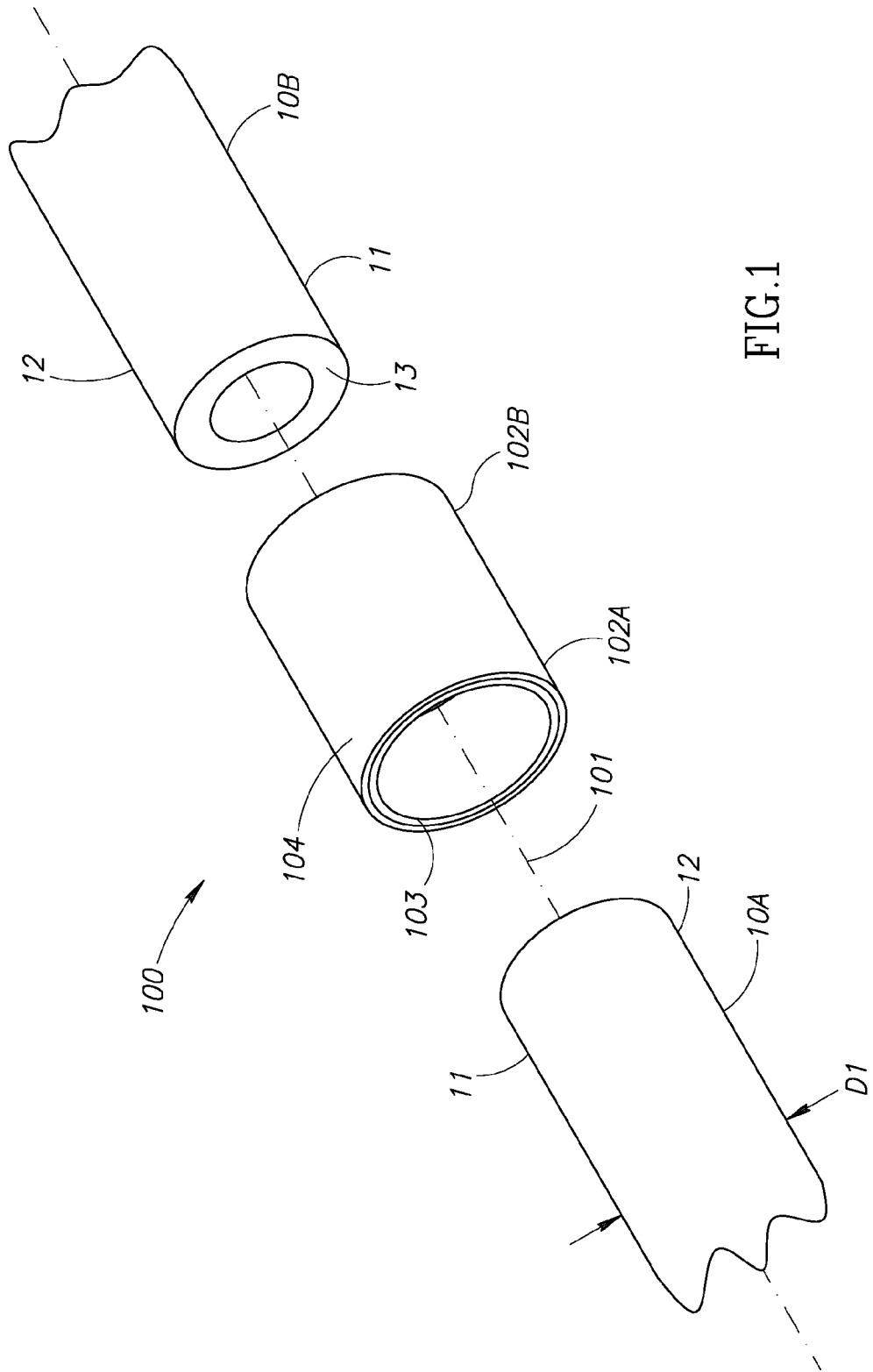
FIG. 1 is a perspective view of a first preferred embodiment of an induction weldable pipe connector including a pair of induction weldable pipe sockets for end to end welding two same diameter plastic pipes into a welded sealed joint.
Figure 2:
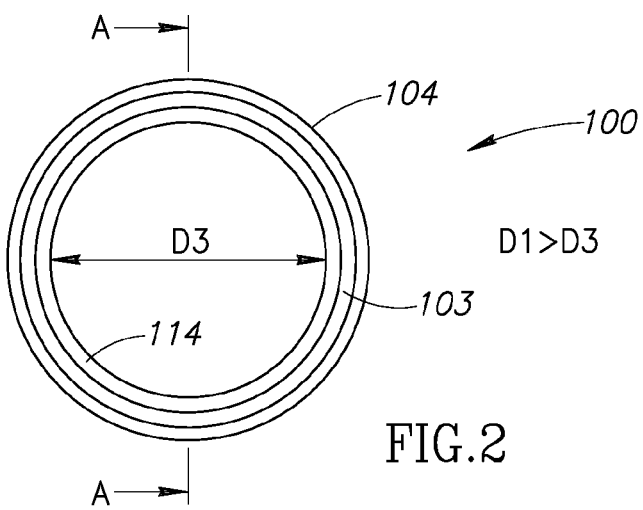
FIG. 2 is an end elevation view of FIG. 1's induction weldable pipe connector.

FIGS. 1 to 4 show an induction weldable pipe connector 100 for electromagnetic induction welding to a pair of plastic pipes 10A and 10B. The plastic pipes can be fabricated from a single plastic material throughout or alternatively have a multilayer composition. Multilayer compositions are used to provide a better combination of mechanical and chemical properties, for example, weight, rigidity, strength, chemical resistance, service pressure, service temperature, and the like. The plastic pipes 10 are typically of the same material. The plastic pipes 10 have external diameters D1 typically in the range of from 10 mm to 30 mm. The plastic pipes 10 have pipe ends 11. The pipe ends 11 have peripheral external pipe end surfaces 12 and annular pipe end faces 13.

The induction weldable pipe connector 100 has a longitudinal pipe connector axis 101 and includes two opposite induction weldable pipe sockets 102A and 102B each intended for forced sliding insertion of a plastic pipe end 11 thereinto. The induction weldable pipe connector 100 has a two ply construction including an internal plastic solder lining 103 and a solid metal susceptor sleeve 104 entirely peripherally enveloping the plastic solder lining 103.

The solder lining 103 has a patterned external solder lining surface 106, an internal solder lining surface 107 and a pair of solder lining end faces 108. The solder lining 103 is made of the same plastic material as the plastic pipes 10. The solder lining 103 has an internal diameter D2. The diameters D1 and D2 are such that a pipe end 11 is required to be forcibly slidingly inserted into a pipe socket 102 for preloading same. Such preloading ensures that melting of solder lining 103 leads in turn to melting of the peripheral external pipe end surfaces 12 thereby welding them together.

The susceptor sleeve 104 is preferably formed from steel to ensure uniform heating of its plastic solder lining 103. The susceptor sleeve 104 has an external susceptor sleeve surface 109, a patterned internal susceptor sleeve surface 111 and a pair of susceptor sleeve end faces 112. The external susceptor sleeve surface 109 is an exposed metal surface which can be printed with technical specification details including inter alia length, internal diameter, external diameter, and the like.

Figure 3:
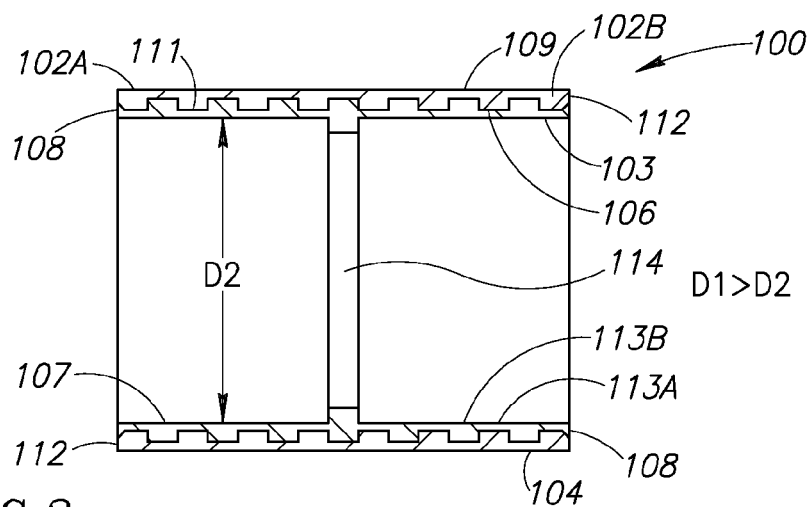
FIG. 3 is a longitudinal cross section of FIG. 1's induction weldable pipe connector along line A-A in FIG. 2.
Figure 4:
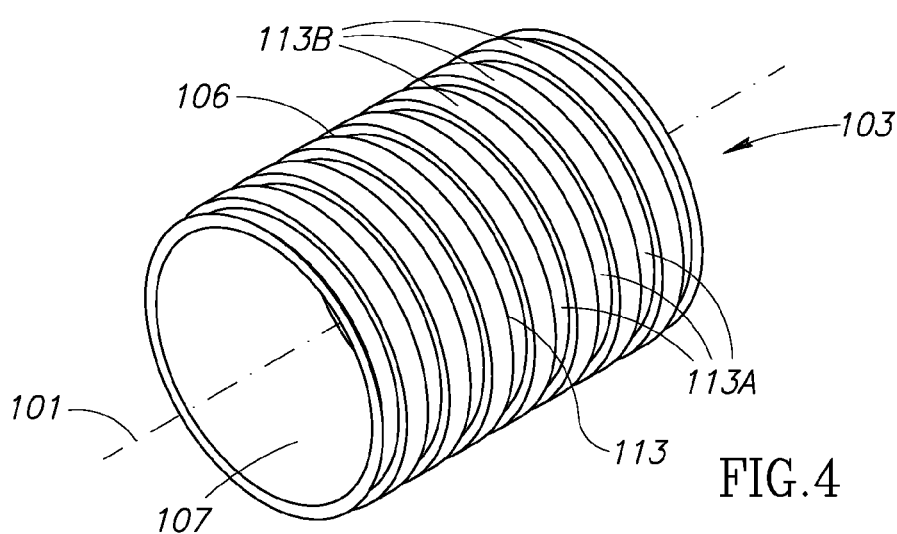
FIG. 4 is a perspective view of a plastic solder lining of FIG. 1's induction weldable pipe connector.

The patterned external solder lining surface 106 and the patterned internal susceptor sleeve surface 111 are in intimate complementary interlocking contact to facilitate heat transfer from the susceptor sleeve 104 to the solder lining 103. FIGS. 3 and 4 show the solder lining 103 includes alternate thin rings 113A and thick rings 113B staggered adjacent to each other along the longitudinal pipe connector axis 101 such that the patterned external solder lining surface 106 appears as a series of stepped ridges in FIG. 3's longitudinal cross section. The rings 113A and 113B can have the same widths along the longitudinal pipe connector axis 101. Alternatively, the rings 113A can have different widths from the rings 113B. Also, the rings 113A and 113B do not necessarily have uniform widths along the longitudinal pipe connector axis 101. Alternative complementary interlocking patterns include inter alia castellated surfaces, grooved surfaces, and the like.

The internal solder lining surface 107 is formed with a central inwardly directed stop 114 having a diameter D3 wherein D1>D3 such that the pipe end faces 13 stop against the inwardly directed stop 114 on the forced sliding insertion of the pipe ends 11 into the pipe connector 100. The stop 114 is preferably formed from the same plastic material as the solder lining 103 and therefore can also be welded together with the two pipe ends. Alternatively, the stop 114 can be formed from a different material from the solder lining 103, for example, metal.

Figure 5:
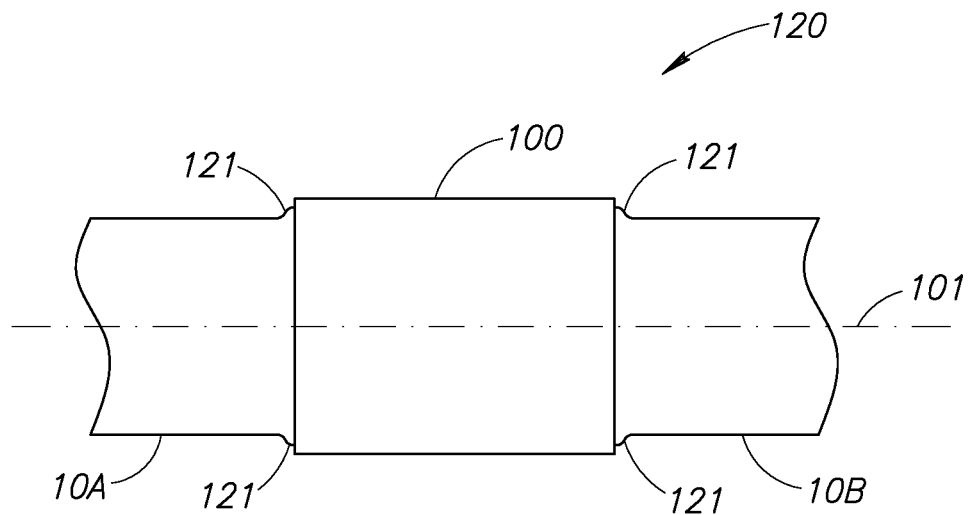
FIG. 5 is a front elevation view of a welded sealed joint of FIG. 1's induction weldable pipe connector and two plastic pipes.
Figure 6:
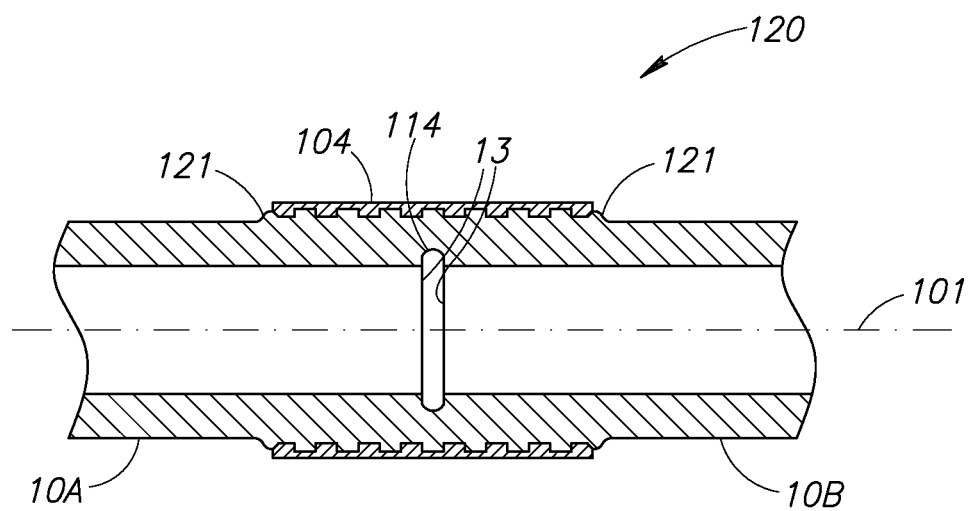
FIG. 6 is a longitudinal cross section of FIG. 5's welded sealed joint along line A-A in FIG. 2.

Electromagnetic induction welding of the induction weldable pipe connector 100 and the two plastic pipes 10 is now described with reference to FIGS. 5 and 6: The plastic pipe ends 11 are forcibly inserted into the opposite pipe sockets 102 to preload same. The pipe end faces 13 stop against the stop 114. An electromagnetic induction coil (not shown) is mounted on the newly formed assemblage and radio frequency electric current is fed to the electromagnetic induction coil. The electromagnetic induction coil generates an electromagnetic field which induces the susceptor sleeve 104 to absorb electromagnetic energy. The susceptor sleeve 104 heats up and concurrently heats the solder lining 103. The solder lining 103 begins to melt as do the peripheral external pipe end surfaces 12 such that the induction weldable pipe connector 100 and the pipe ends 11 together form a welded sealed joint 120. Such melting is often evidenced by melted plastic material exuding beyond the susceptor sleeve end faces 112 to form annular plastic extrusions 121 on either side of the welded sealed joint 120. FIGS. 5 and 6 show the annular pipe end faces 13 are spaced apart from one another in the welded sealed joint 120. Depending on solder lining 103, the stop 114, the amount of electromagnetic energy supplied, and other factors, the opposing annular pipe end faces 113 and the stop 114 can form a continuous welded area.

Figure 7:
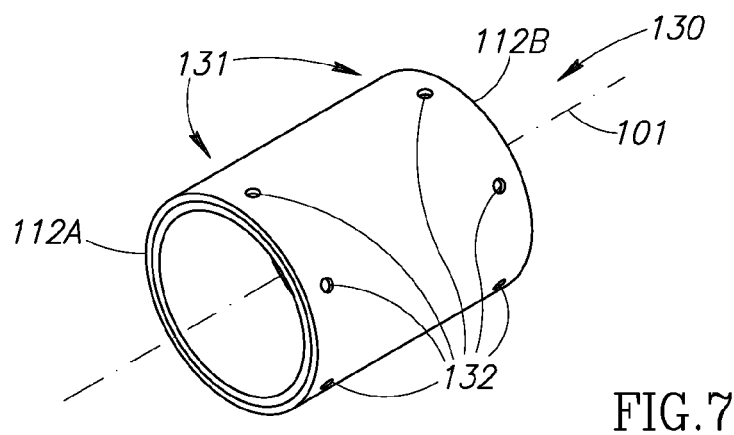
FIG. 7 is a perspective view of a second preferred embodiment of an induction weldable pipe connector with inspection apertures.
Figure 8:
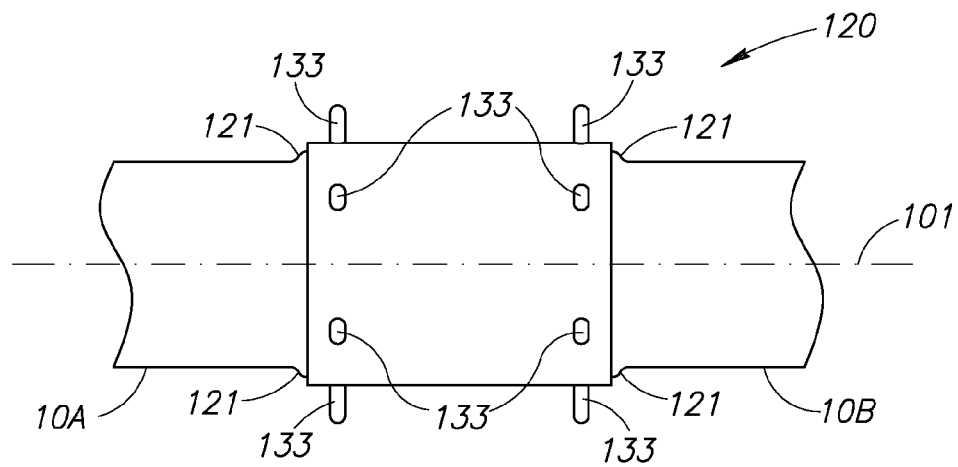
FIG. 8 is a front elevation view of a welded sealed joint of FIG. 7's induction weldable pipe connector and two plastic pipes.
Figure 9:
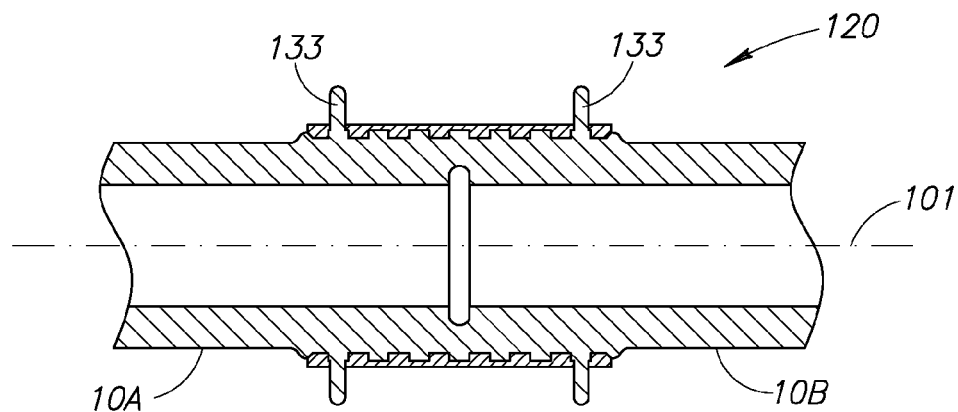
FIG. 9 is a longitudinal cross section of FIG. 8's welded sealed joint along line A-A in FIG. 2.

FIG. 7 shows an induction weldable pipe connector 130 similar to the induction weldable pipe connector 100 and therefore similar parts are likewise numbered. The former 130 differs from the latter 100 insofar the former 130 includes a susceptor sleeve 104 having a series 131 of radial small diameter inspection apertures 132 slightly inwards of its left susceptor sleeve end surface 112A and a series 131 of radial small diameter inspection apertures 132 slightly inwards of its right susceptor sleeve end surface 112B. FIGS. 8 and 9 show the welded sealed joint 120 including the annular plastic extrusions 121 and additionally outward radial protrusions 133 formed from the solder lining 103.

Figure 10:
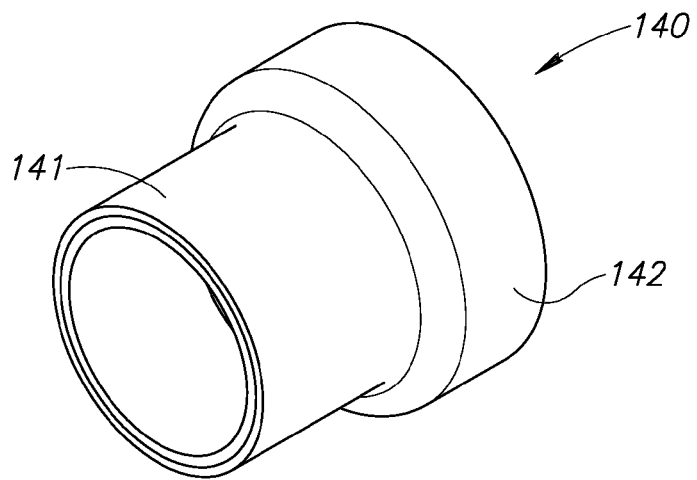
FIG. 10 is a perspective view of an induction weldable pipe connector for welding two different diameter plastic pipes.

FIG. 10 shows an induction weldable pipe connector 140 for electromagnetic induction welding two different diameter plastic pipes. The induction weldable pipe connector 140 includes a first induction weldable pipe socket 141 and a second induction weldable pipe socket 142. The pipe sockets 141 and 142 can be designed to weld plastic pipes of the same material or different material.

Figure 11:
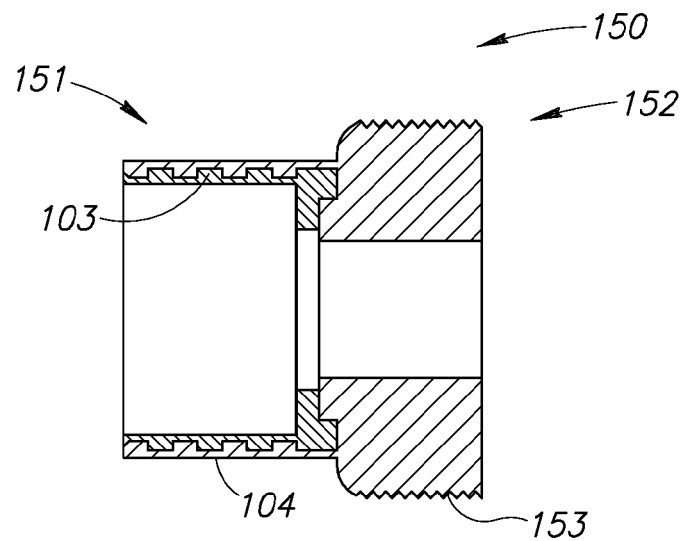
FIG. 11 is a longitudinal cross section of an induction weldable pipe connector including an induction weldable pipe socket and a connector end with an external screw thread.

FIG. 11 shows an induction weldable pipe connector 150 including an induction weldable pipe socket 151 for electromagnetic induction welding to a plastic pipe 20 and a connector end 152 with an external screw thread 153. The pipe socket 151 includes a plastic solder lining 103 and a susceptor sleeve 104. The connector end 152 is preferably also metal and integrally formed with the susceptor sleeve 104.

Figure 12:
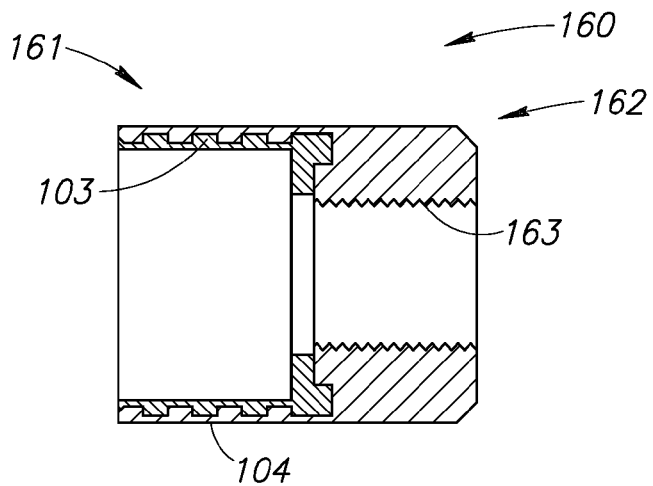
FIG. 12 is a longitudinal cross section of an induction weldable pipe connector including an induction weldable pipe socket and a connector end with an internal screw thread.
Figure 13:
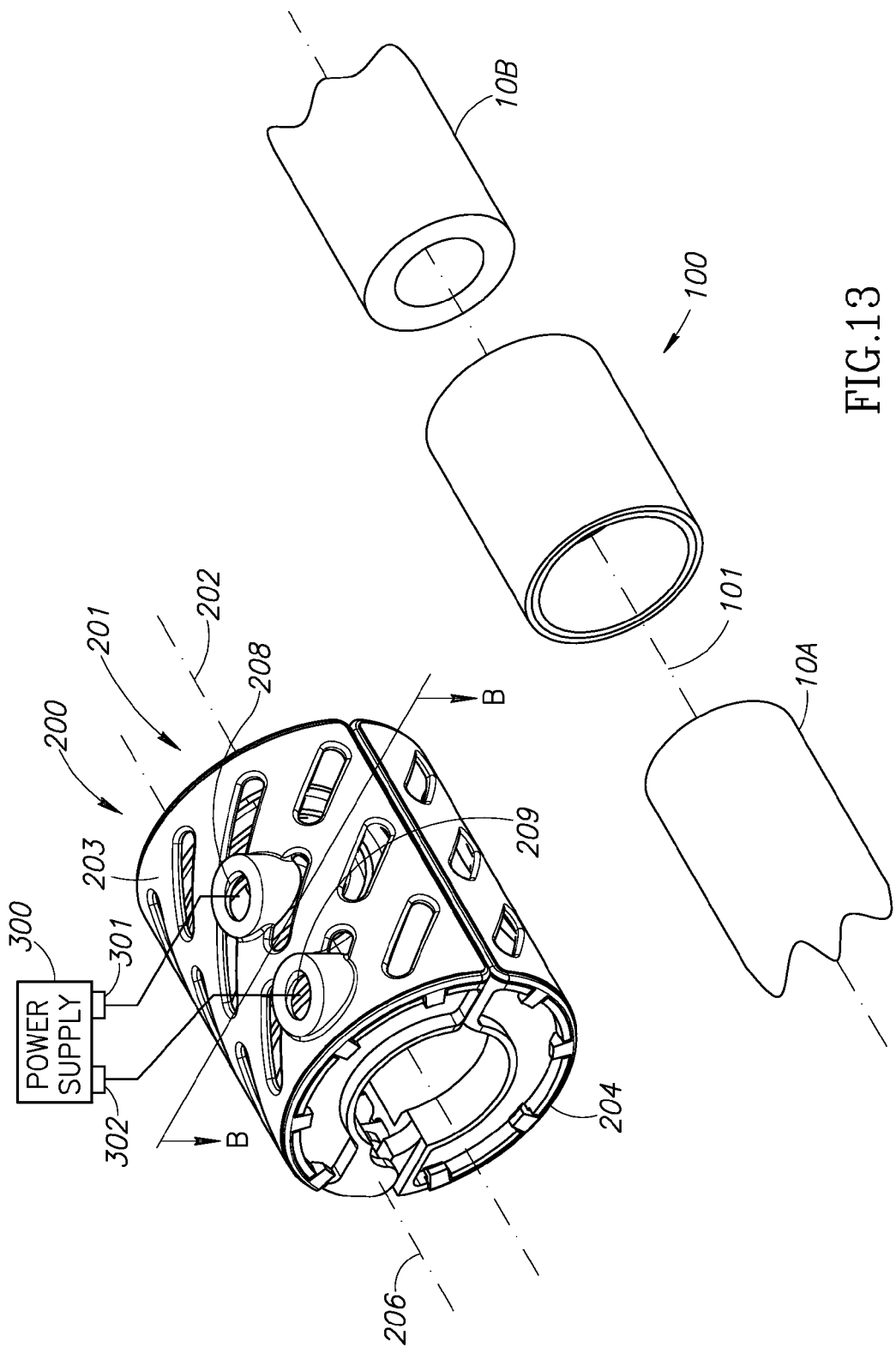
FIG. 13 is a front perspective view of a first preferred embodiment of an electromagnetic induction coil assembly for electromagnetic induction welding an induction weldable pipe connector and two plastic pipes to form a welded sealed joint.
Figure 14:
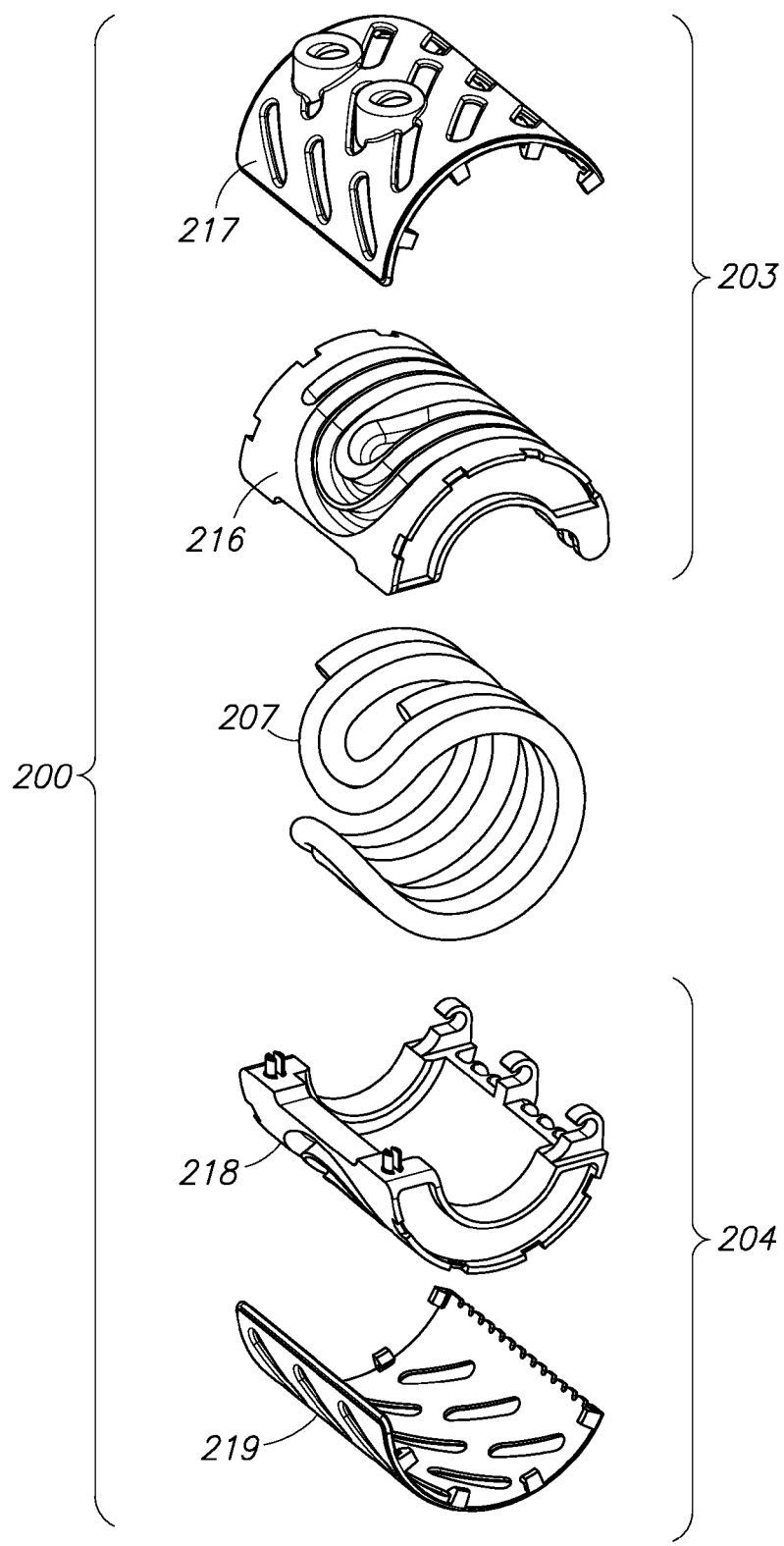
FIG. 14 is an exploded view of FIG. 13's electromagnetic induction coil assembly.
Figure 15:
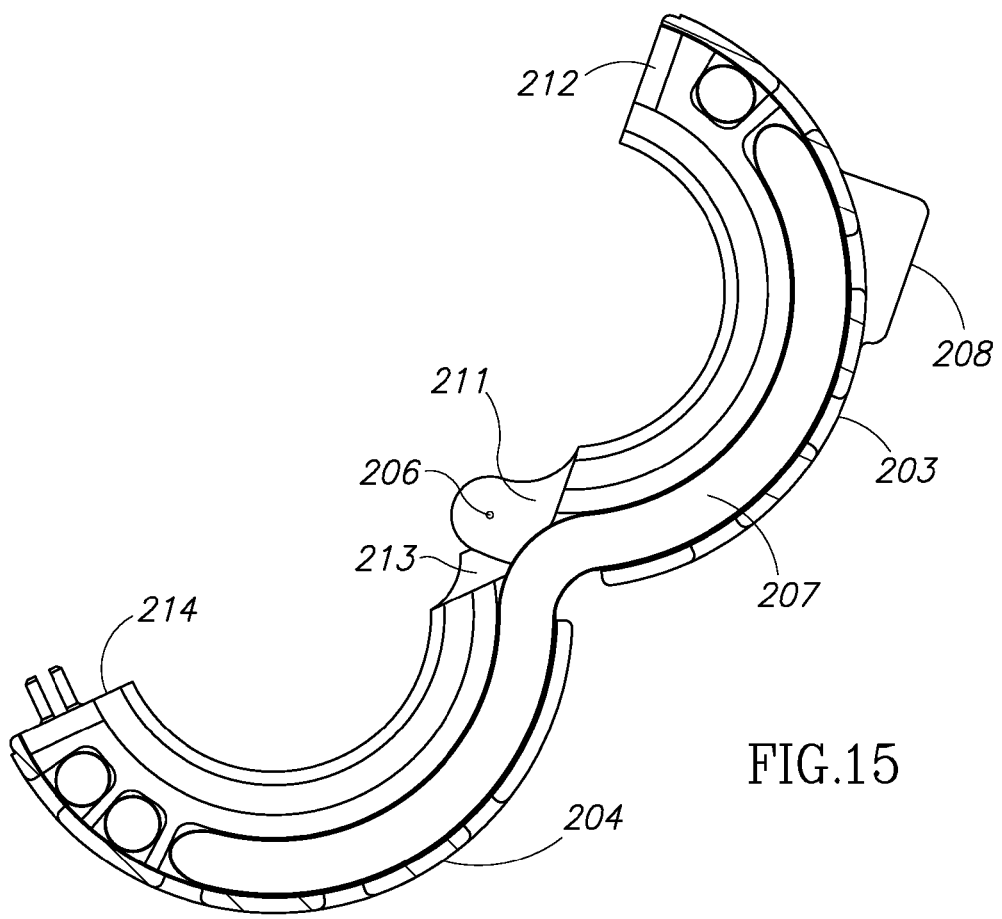
FIG. 15 is a transverse cross section of FIG. 13's electromagnetic induction coil assembly in its open position along line B-B in FIG. 13.
Figure 16:
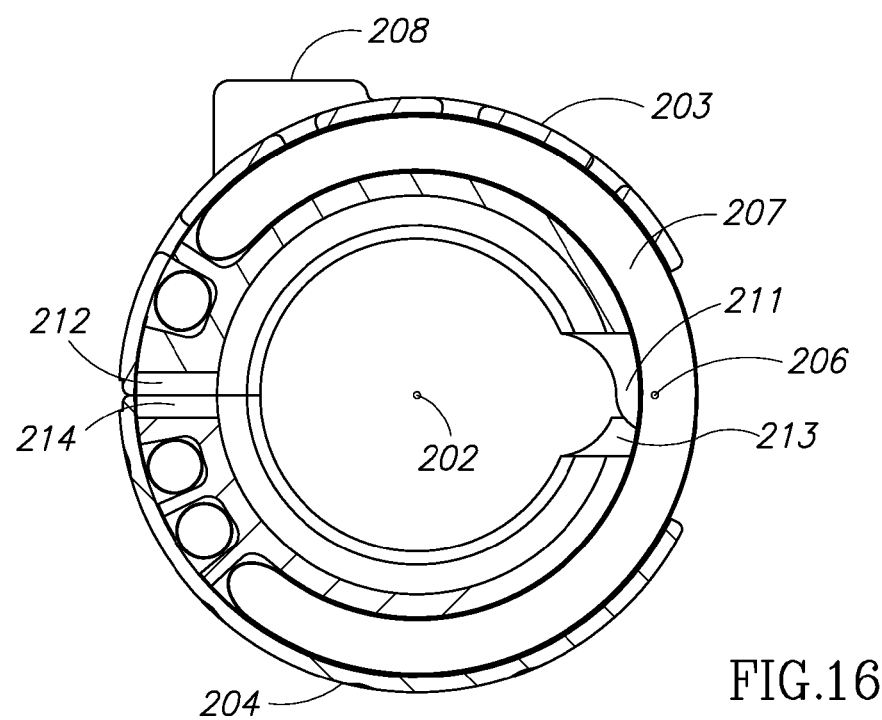
FIG. 16 is a transverse cross section of FIG. 13's electromagnetic induction coil assembly in its closed position along line B-B in FIG. 13.

FIG. 12 shows an induction weldable pipe connector 160 including an induction weldable pipe socket 161 for welding to a plastic pipe and a connector end 162 with an internal screw thread 163. The pipe socket 161 includes a plastic solder lining 103 and a susceptor sleeve 104. The connector end 162 is preferably also metal and integrally formed with the susceptor sleeve 104.

Electromagnetic Induction Coil Assemblies

FIGS. 13 to 16 show an electromagnetic induction coil assembly 200 for use with a power supply 300 having a first polarity terminal 301 and a second opposite polarity terminal 302 for electromagnetic induction welding an induction weldable pipe connector 100 onto a pair of plastic pipes 10 to form a welded sealed joint 120. The electromagnetic induction coil assembly 200 includes a tubular housing 201 having a longitudinal housing axis 202 intended to be co-directional with the longitudinal pipe connector axis 101.

Figure 19:
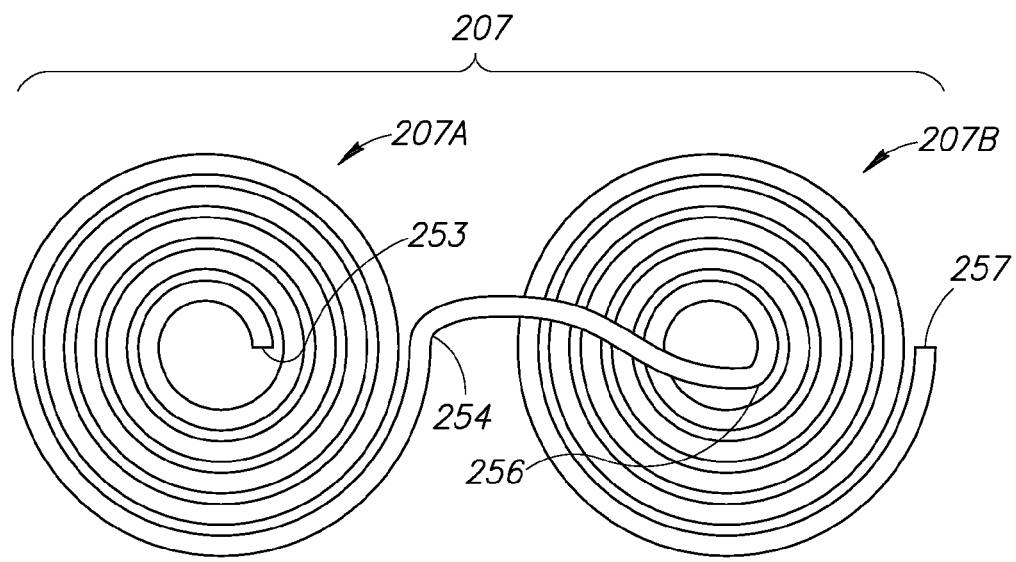
FIG. 19 is a schematic view of a first embodiment of a dual component induction coil of the electromagnetic induction coil assemblies of the present invention.
Figure 20:
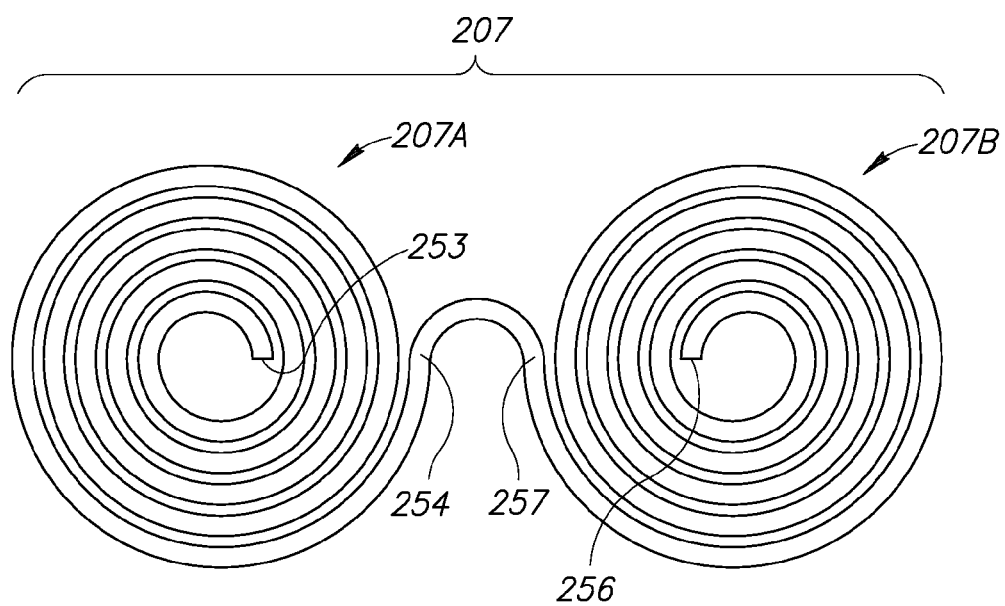
FIG. 20 is a schematic view of a second embodiment of a dual component induction coil of the electromagnetic induction coil assemblies of the present invention.

The housing 201 includes a generally semi-tubular first shell 203 pivotal on a semi-tubular second shell 204 about a pivot axis 206 parallel to and spaced apart from the longitudinal housing axis 202. The housing 201 also includes a single induction coil 207 having a first induction coil terminal 208 for electrical connection with the first polarity terminal 301 and a second induction coil terminal 209 for electrical connection with the second opposite polarity terminal 302. The induction coil 207 is preferably made from flexible carbon fiber wires. The induction coil terminals 208 and 209 are provided adjacent in either shell of the shells 203 and 204 for facilitating electrical connection to the polarity terminals 301 and 302. Alternatively, the first shell 203 can include a first induction coil component 207A and the second shell 204 can include a second induction coil component 207B in series connection with the first induction coil component 207A and so arranged that their respective electromagnetic fields combine together. FIGS. 19 and 20 show suitable dual component induction coils 207.

The shell 203 has a pivoted major edge 211 along the pivot axis 206 and a free major edge 212 opposite the pivoted major edge 211. The shell 204 has a pivoted major edge 213 along the pivot axis 206 and pivotal on the major edge 211 and a free major edge 214 opposite the pivoted major edge 213 for facing the free major edge 212 in a closed position of the housing 201. The shells 203 and 204 are manually disposable between an open position (see FIG. 15) for placing the electromagnetic induction coil assembly 200 on the induction weldable pipe connector 100 and for its removal therefrom subsequent to forming a welded sealed joint. The electromagnetic induction coil assembly 200 has a closed position (see FIG. 16) for enveloping the induction weldable pipe connector 100 for electromagnetic induction welding purposes.

The shells 203 and 204 each have a dual component construction. The shell 203 has a base member 216 and a vented cover 217. The shell 204 has a base member 218 and a vented cover 219. The induction coil 207 includes several spirals which are compressed together widthwise to form an oval shape which is mounted on the base members 216 and 218 and covered by the covers 217 and 219. The induction coil 207 can have clockwise spiral or a counter clockwise spiral. The induction coil 207 extends lengthwise from the free major edge 212 to the free major edge 214 and traverses the pivot axis 206 such that the induction coil 207 undergoes inflection at the pivot axis 206 on manually disposing the housing 201 between its open position (see FIG. 15) and its closed position (see FIG. 16).

In the housing's closed position, the induction coil 207 has a near tubular shape for nearly entirely enveloping the induction weldable pipe connector 100 whereupon operation of the power supply 300 energizes the induction coil 207 to generate a substantially uniform electromagnetic field around the induction weldable pipe connector 100 at a given radial distance from the longitudinal pipe connector axis 101 for inducing electromagnetic induction therein for forming a welded sealed joint 120 with the plastic pipe ends 11.

Figure 17:
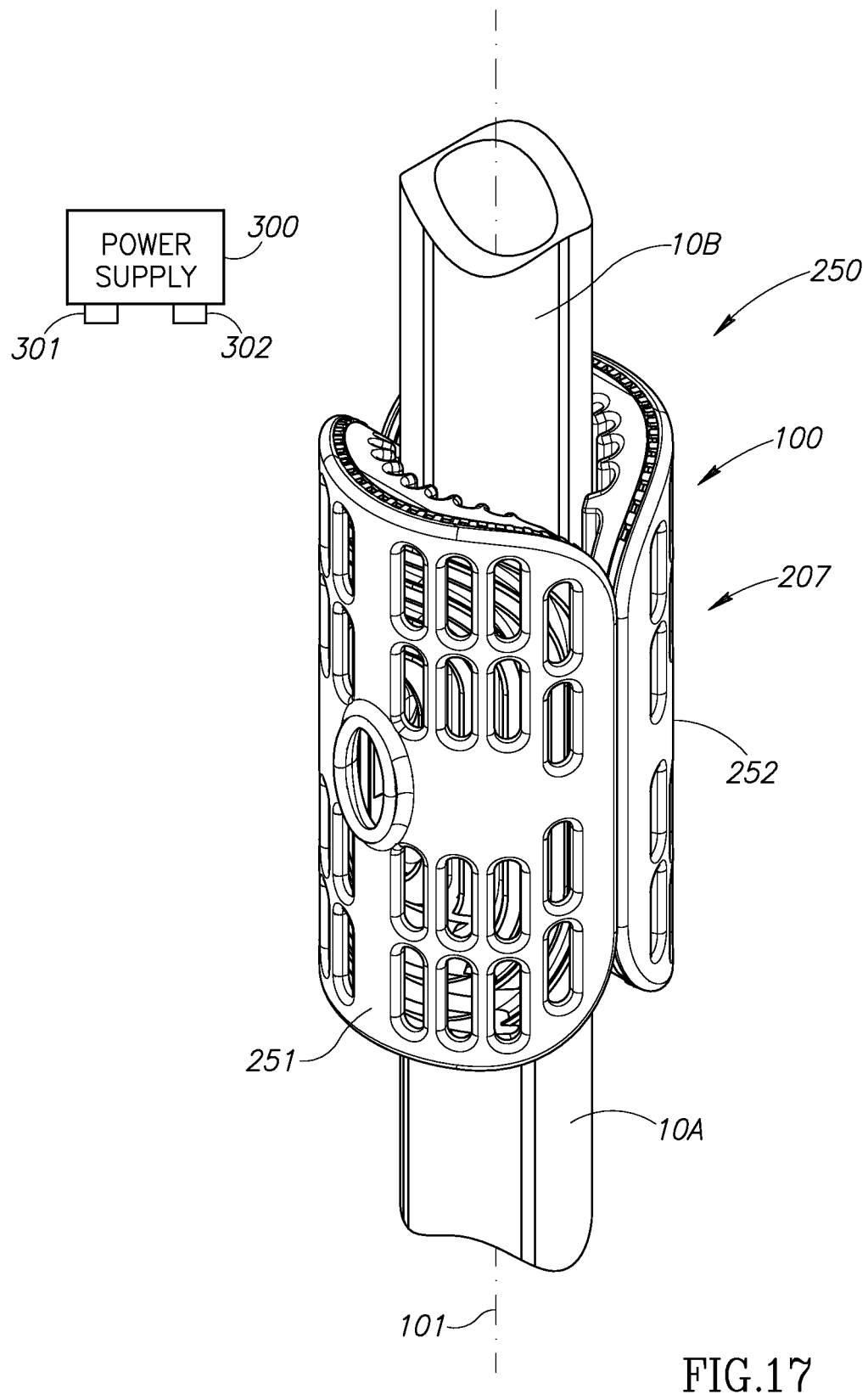
FIG. 17 is a front perspective view of a second preferred embodiment of an electromagnetic induction coil assembly clamped on an induction weldable pipe connector for end-to-end welding of two plastic pipes.
Figure 18:
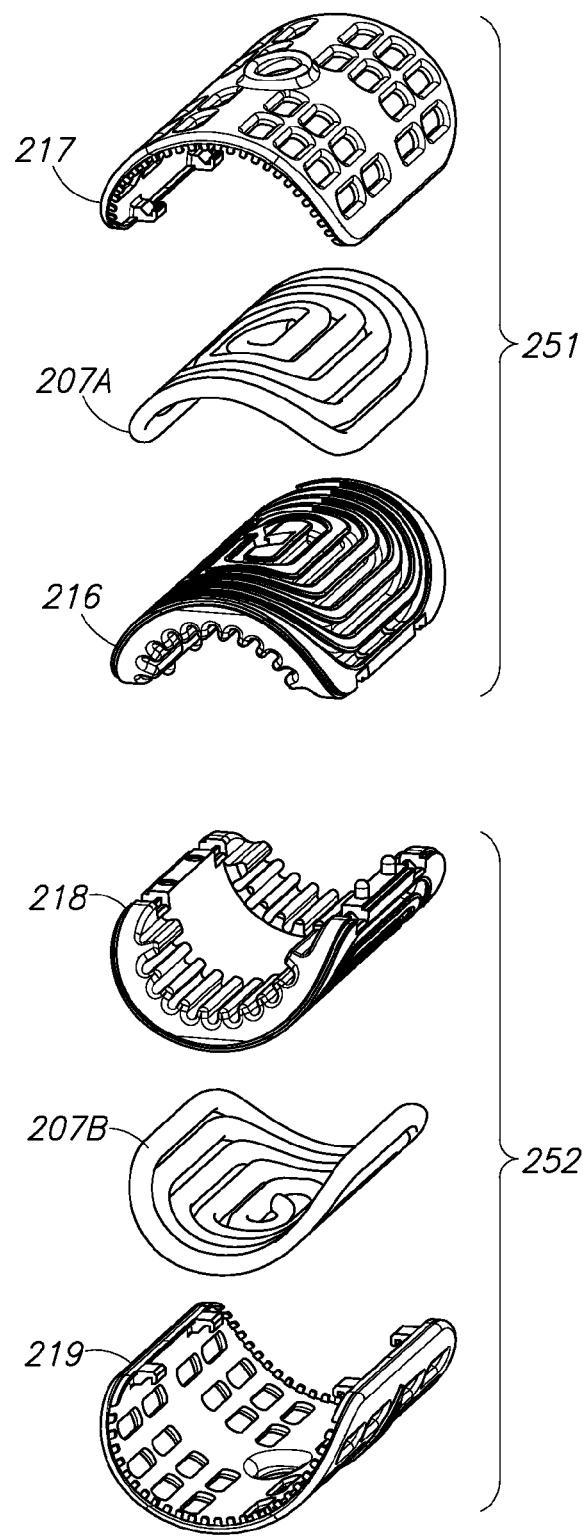
FIG. 18 is an exploded view of FIG. 17's electromagnetic induction coil assembly.

FIGS. 17 and 18 show an electromagnetic induction coil assembly 250 also for use with the power supply 300. The electromagnetic induction coil assembly 250 is similar in construction and operation to the electromagnetic induction coil assembly 200 and therefore similar parts are likewise numbered. The former 250 differs from the latter 200 insofar as the former 250 includes shells 251 and 252 which are detached from each other in the housing's open position. The shells 251 and 252 have similar constructions as the shells 203 and 204 insofar the shell 251 includes a base member 216 and a vented cover 217 and the shell 252 includes a base member 218 and a vented cover 219.

The electromagnetic induction coil assembly 250 includes a dual component induction coil 207 having a first spiral coil component 207A for series electrical connection to a second spiral coil component 207B correspondingly housed in the shells 251 and 252. FIGS. 19 and 20 show suitable dual component induction coils 207. The dual component induction coil 207 includes two induction coil terminals 208 and 209 for electrical connection to the first polarity terminal 301 and the second opposite polarity terminal 302. The two shells 251 and 252 can each be provided with one of the induction coil terminals 208 and 209 or alternatively one of the shells 251 and 252 can be provided with both induction coil terminals 208 and 209.

The spiral coil components 207A and 207B are each mounted in their respective shells 203 and 204 such that the induction coil 207 has a near tubular shape for nearly entirely enveloping the induction weldable pipe connector 100. Operation of the power supply 300 energizes the first spiral coil component 207A to generate a first electromagnetic field and the second spiral coil component 207B to generate a second electromagnetic field. The two electromagnetic fields combine to form a substantially uniform electromagnetic field intensity around the induction weldable pipe connector 100 at a given radial distance from the longitudinal pipe connector axis 101 for inducing electromagnetic induction therein for forming a welded sealed joint.

FIGS. 19 and 20 show schematic views of dual component induction coils 207 for use in either of electromagnetic induction coil assemblies 200 and 250. The dual component induction coils 207 can include either a pair of clockwise spiral coil components, a pair of counterclockwise spiral coil components, or a combination of one clockwise spiral coil component and one counter clockwise spiral coil component.

FIG. 19 shows a clockwise first spiral coil component 207A and a clockwise second spiral coil component 207B. The first spiral coil component 10 207A has a central first spiral coil component terminal 253 for electrical connection with a first polarity terminal 301 and a lateral first spiral coil component terminal 254. The second spiral coil component 207B has a central second spiral coil component terminal 256 in electrical connection with the lateral first spiral coil component terminal 254 and a lateral second spiral coil component terminal 257 for electrical connection with a second opposite polarity terminal 302.

FIG. 20 shows a clockwise first spiral coil component 207A and a counterclockwise second spiral coil component 207B. The first spiral coil component 207A has a central first spiral coil component terminal 253 for electrical connection with a first polarity terminal 301 and a lateral first spiral coil component terminal 254. The second spiral coil component 207B has a central second spiral coil component terminal 256 for electrical connection with a second opposite polarity terminal 302 and a lateral second spiral coil component terminal 257 in electrical connection with the lateral first spiral coil component terminal 254.

While the invention has been described with respect to a limited number of embodiments, it will be appreciated that many variations, modifications, and other applications of the invention can be made within the scope of the appended claims.

The invention claimed is:

1. An induction weldable pipe connector for electromagnetic induction welding to a plastic pipe having a pipe end with an external diameter D1, the induction weldable pipe connector comprising at least one induction weldable pipe socket, each said induction weldable pipe socket having a longitudinal axis and including:

i) a plastic solder lining having a patterned external solder lining surface, an internal solder lining surface and at least one solder lining end face, said internal solder lining surface having an internal diameter D2 wherein D1>D2 thereby requiring forced sliding insertion of the pipe end into said pipe socket for preloading same, wherein said solder lining end face is exposed, annular, and transverse to the longitudinal axis, and ii) a solid metal susceptor sleeve entirely peripherally enveloping said plastic solder lining, said susceptor sleeve having an external susceptor sleeve surface, a patterned internal susceptor sleeve surface and at least one susceptor sleeve end face, said patterned internal susceptor sleeve surface being in intimate complementary interlocking contact with said patterned external solder lining surface, wherein said susceptor sleeve end face is exposed, annular, and transverse to the longitudinal axis, and said susceptor sleeve end face is overlying said solder lining end face, whereupon on inducing electromagnetic induction in said pipe socket, said susceptor sleeve absorbs electromagnetic energy for melting said solder lining for welding said pipe socket to the pipe end, wherein said preloading and interlocking cause said melted solder lining to exude along the longitudinal axis beyond said susceptor sleeve end face to form an annular plastic extrusion.

2. The connector according to claim 1 wherein said external susceptor sleeve surface is an exposed metal surface.

3. The connector according to claim 1 wherein said susceptor sleeve includes at least one radial small diameter inspection aperture through which melted solder lining exudes therethrough on said application of electromagnetic induction for providing a user indication regarding progress of electromagnetic induction welding.

4. The connector according to claim 3 wherein said at least one radial small diameter inspection aperture is adjacent said susceptor sleeve end face.

5. The connector according to claim 3 wherein said susceptor sleeve includes a series of radial disposed small diameter inspection apertures through which melted solder lining exudes therethrough on said application of electromagnetic induction for providing a user indication regarding progress of electromagnetic induction welding.

6. The connector according to claim 1 wherein said solder lining includes alternate thin rings and thick rings staggered adjacent to each other along said longitudinal pipe connector axis such that said patterned external solder lining surface appears as a series of stepped ridges in a longitudinal cross section of the pipe connector.

7. A plastic pipe distribution system including at least one induction weldable pipe connector according to claim 1.

8. A method for electromagnetic induction welding an induction weldable pipe connector to a plastic pipe, the plastic pipe having a pipe end with an external diameter D1, the induction weldable pipe connector including:
i) at least one induction weldable pipe socket, each induction weldable pipe socket having a longitudinal axis and a plastic solder lining having a patterned external solder lining surface, an internal solder lining surface and at least one solder lining end face, the internal solder lining surface having an internal diameter D2 wherein D1>D2 thereby requiring forced sliding insertion of the pipe end into the pipe socket for preloading same, and ii) a solid metal susceptor sleeve entirely peripherally enveloping the plastic solder lining, the susceptor sleeve having an external susceptor sleeve surface, a patterned internal susceptor sleeve surface and at least one susceptor sleeve end face, the patterned internal susceptor sleeve surface being in intimate complementary interlocking contact with the patterned external solder lining surface,
wherein said solder lining end face and said susceptor sleeve end face are exposed, annular, and transverse to the longitudinal axis, and said susceptor sleeve end face is overlying said solder lining end face,
the method comprising the steps of:
(a) forced sliding insertion of the pipe end into the pipe socket for preloading the pipe socket; and
(b) inducing electromagnetic induction in the pipe socket for heating the susceptor sleeve for melting the solder lining for welding the pipe socket to the pipe end,
wherein the preloading and the interlocking cause melted solder lining to exude along the longitudinal axis beyond said susceptor sleeve end face to form an annular plastic extrusion.

9. The method according to claim 8 wherein the external susceptor sleeve surface is an exposed metal surface.

10. The method according to claim 8 wherein the susceptor sleeve includes at least one radial small diameter inspection aperture through which melted solder lining exudes therethrough on the application of electromagnetic induction for providing a user indication regarding progress of electromagnetic induction welding.

11. The method according to claim 10 wherein the at least one radial small diameter inspection aperture is adjacent the susceptor sleeve end face.

12. The method according to claim 10 wherein the susceptor sleeve includes a series of radial disposed small diameter inspection apertures through which melted solder lining exudes therethrough on the application of electromagnetic induction for providing a user indication regarding progress of electromagnetic induction welding.

13. The method according to claim 8 wherein the solder lining includes alternate thin rings and thick rings staggered adjacent to each other along the longitudinal pipe connector axis such that the patterned external solder lining surface appears as a series of stepped ridges in a longitudinal cross section of the pipe connector.

* * * * *